May 21, 1957     E. G. BRICKLER     2,792,665

FISHING FLOAT

Filed Oct. 25, 1954

INVENTOR.
EDWARD G. BRICKLER,
BY
ATTORNEYS.

United States Patent Office 2,792,665
Patented May 21, 1957

2,792,665

FISHING FLOAT

Edward G. Brickler, Newport, Ky.

Application October 25, 1954, Serial No. 464,380

5 Claims. (Cl. 43—44.87)

My invention relates to fishing floats or bobbers and more particularly to an elongated float adapted to float upright in the water.

It has hitherto been proposed to provide an elongated floating body with a sufficient weight at its lower end to keep it upright in the water, thereby making it more easily seen by the fisherman. With such a float it is not necessary to use a heavy sinker near the hook; and consequently a fish taking the hook will encounter less resistance. However, I have observed that even with floats of this character the mass of the float itself as it is pulled under water when the hook is taken by the fish, offers considerable resistance and often as not alarms the fish and to cause it to release the bait before it is firmly hooked.

I have also observed that with a conventional elongated float the fishing line contacts the float at the top end thereof and extends downwardly through the float exiting at the bottom end thereof. With such an arrangement the float is effected by the winds tending to blow the line and cause the bait and float to shift to other than the desired location in the water.

It is, therefore, a principal object of my invention to provide an elongated fishing float designed to stand erect in the water and designed in shape to offer the minimum amount of resistance to being submerged when a fish takes the bait.

It is a principal object of my invention to provide a fishing float of the character described wherein the fishing line runs through a slantwise passageway in the body of the float, entering the float at about the water level and emerging at the bottom thereof.

Yet a further object of my invention is the provision of a float of the character described in which the point of entry of the line into the float body lies on one side of its center line, whereas its point of exit lies on the opposite side of the center line, and wherein the point of entry is spaced from the center line by a lesser distance than is the point of exit. This arrangement serves to maintain the float in upright position when the line becomes waterlogged and sags in the water, thereby compensating for line "pull" tending to tilt the float in an undesirable manner.

Yet a further object of my invention is the provision of a float or bobber of the character described which is simple and inexpensive to produce and yet is of sufficient weight to facilitate casting and is so designed as to implement rather than impede casting the line.

The arrangement of parts is such that it will expedite preparation of the line for float fishing. These and other objects of my invention which will appear hereinafter or which will be apparent to the skilled worker in the art upon reading these specifications, I accomplish by those constructions and arrangements of parts of which I shall now describe certain exemplary embodiments.

Reference is now made to the accompanying drawings wherein.

Briefly, in the practice of my invention, I provide a fishing float or bobber characterized by an enlarged lower portion and an elongated upper portion of reduced size and weight. The lower portion of the float is weighted at its lower end with sufficient lead or other substance to maintain it upright in the water with substantially only the upper, reduced portion of the float extending out of the water. Consequently when the float is submerged— as when a fish takes the bait—the mass of submerged floatable material is only slightly increased and consequently the float will offer only slight resistance to being submerged. I have found this action to be highly desirable since a material increase in resistance, as encountered in an ordinary elongated float, will alarm the fish and cause it to release the bait. It is, however, desirable that the upper portion of the float provide some additional floatable mass so as to assure the ready return of the float to the surface of the water upon being released.

In accordance with my invention, the lower portion of the float body is provided with a slantwise passageway through which the fishing line is adapted to pass. The upper end of the passageway preferably lies just above the water line of the float to one side of the center line thereof and extends downwardly and exits on the opposite side of the float adjacent its bottom. Preferably the passageway will comprise a tubular member extending through the float body and of a size to slidably receive the line. I have found it desirable to employ a tube only slightly larger in diameter than the line itself, thereby eliminating the necessity for a bead to establish the length of line extending beneath the float. Where the tube is of restricted diameter, I have found that a rubber band, for example, may be tied to the line and will serve to establish the proper hook level. I have found a bead to be undesirable for this purpose since, as it strikes against the mouth of the passageway, it makes sufficient noise to alarm the fish.

In addition to placing the entrance end of the passageway at or adjacent the water line of the float, I also find it desirable to have the entrance end of the passageway lie closer to the center line of the float than the exit end thereof. This permits a more perfect upright position of the float in the water, particularly when the line becomes waterlogged and tends to sag beneath the surface of the water between the float and the angler's rod or pole.

Figure 1:
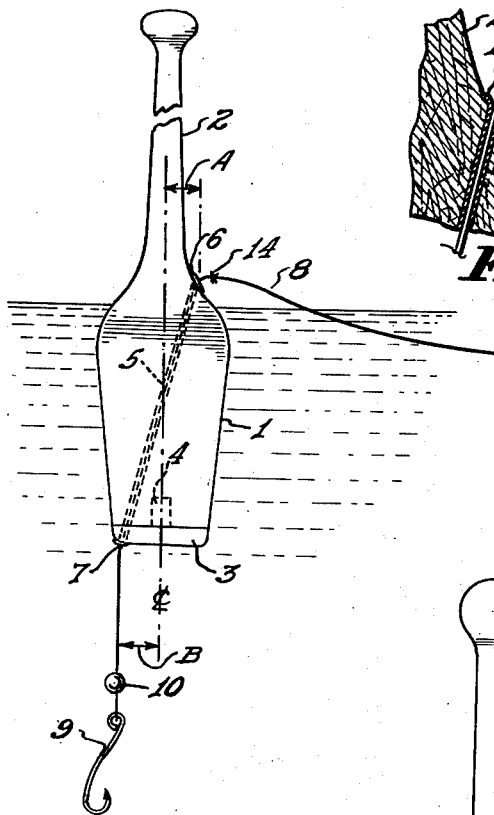
Figure 1 is a side elevational view with interior parts in dotted lines illustrating a preferred embodiment of my invention.
Figure 2:
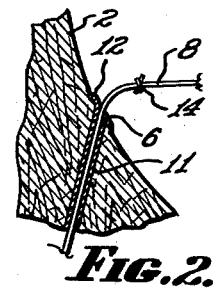
Figure 2 is an enlarged fragmentary vertical sectional view illustrating the upper end of the line receiving passageway.
Figure 3:
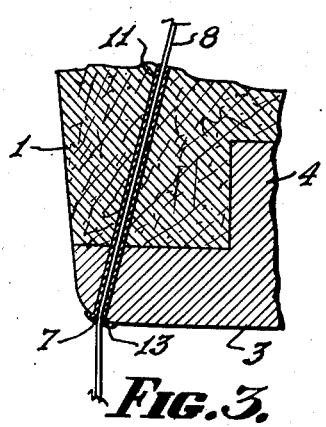
Figure 3 is an enlarged fragmentary vertical sectional view illustrating the lower exit end of the line receiving passageway.

Referring now to Figure 1 of the drawings, I have therein illustrated an elongated float having an enlarged lower portion 1 and an elongated upper portion 2 of diminished size and weight. Preferably the upper portion 2 of the float will be considerably longer than the lower portion and extend out of the water some five or six inches. The bottom of the lower portion 1 is provided with a weight 3 which may be in the form of a lead casting or the like. Suitable means 4 will be provided to securely fix the weight 3 to the float body.

The material from which the float body is formed does not constitute a limitation on my invention and diverse floatable materials may be employed. A light weight wood such as balsa is preferred, although a hollow body formed of plastic material has also been found suitable when properly weighted. It is, however, essential that the dimensioning of the parts is such that the lower portion 1 of the body lies substantially beneath the water with only the elongated upper portion 2 extending thereabove. Similarly, the upper portion of the float must be of greatly reduced mass as compared with the lower portion and yet sufficient additional mass must be present to assure the return of the float to the surface of the water once it has been submerged and released. To this end, I have found a float contoured in the manner illustrated in Figure 1 to be highly successful.

A line receiving passageway 5 extends slantwise through the lower portion of the float body, having an entrance opening 6 lying to one side of the float and an exit opening 7 at the bottom of the float on the opposite side thereof. The opening 6 lies at or preferably slightly above the water line of the float, whereas the exit opening opens downwardly at the bottom of the float, preferably extending through the weight 3 in the manner illustrated. The fishing line 8 extends through the passageway and a suitable hook 9 will be fixed to its lower end. Since the float itself is weighted to maintain it in upright position only a small bead weight 10 sufficient to hold down the hook and the lower portion of the line need be provided.

The passageway extending through the float body will be preferably defined by a tube 11 which will preferably be formed of plastic or other non-corrosive material. At its upper and lower ends it is preferred to flare the tube, as at 12 and 13, respectively, to form eyelets.

It is preferred that the diameter of the tube 11 be only slightly larger than the diameter of the line 8 so that the conventional bead employed to determine the length of line extending below the float may be eliminated. In its place I prefer to use a rubber band 14 slidably secured to the line and adapted to abut against the upper end of the passageway, in the manner illustrated. The line can be easily passed through the passageway by inserting its free end in the opening 6 and then sucking on the passageway through the opening 7 at the opposite end thereof.

It will be noted that the slantwise passageway 5 crosses the center line of the float with the openings 6 and 7 lying on opposite sides thereof. In accordance with my invention the distance A between the entrance opening 6 and the center line of the float is less than the distance B between the exit opening 7 and the center line of the float. This distance will, of course, vary with the size of the float; but where the relationship set forth is observed, the tendency of the portion of the line extending from the opening 6 to the angler's pole or rod to drag and hence tilt the float to one side, will be offset by the hook 9, bead 10 and the depending portion of the line extending from the exit opening 7, the latter portion of the line and the parts secured thereto acting to pivot the float about its center line. In addition, where this relationship is observed, the float will assume the proper casting position on the line.

Figure 4:
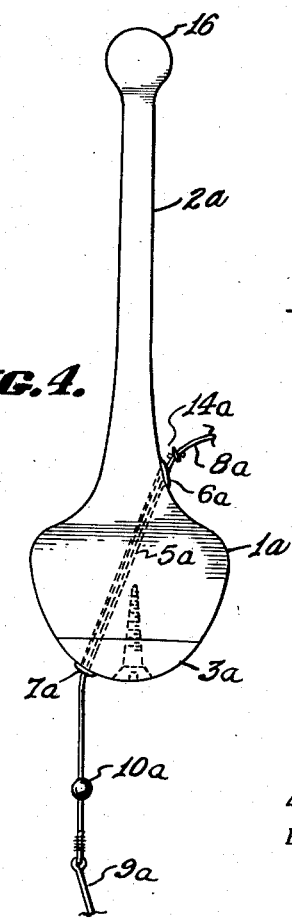
Figure 4 is a side elevational view of an alternative form of my invention.

In Figure 4 of the drawings I have illustrated a modified float design. Here again, it will be apparent that the lower portion 1a of the float body has a mass considerably greater than the upper portion 2a which, if desired, may be formed from brightly colored plastic material and provided at its top with a readily visible sphere 16. As in the case of the preceding embodiment, the enlarged lower portion of the float has a passageway 5a extending slantwise therethrough, the entrance opening 6a lying to one side of the float at or slightly above its water line, with the exit opening 7a at the bottom of the float where it opens through the weight 3a. A fishing line 8a extends through the passageway as in the earlier embodiment, being provided with a hook 9a, a sinker 10a and a depth control stop 14a.

Figure 5:
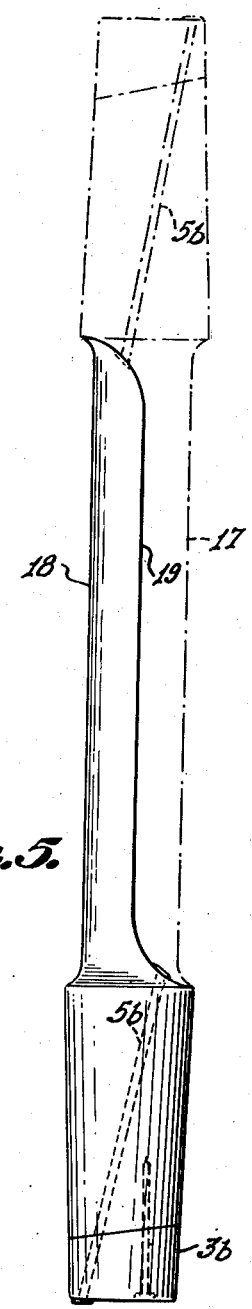
Figures 5 is a side elevational view with parts in dotted lines illustrating yet another embodiment of my invention.

In Figure 5, I have illustrated yet another modification of my invention wherein two float bodies, indicated at 17 and 18, may be formed from a single cylindrical blank, the blank being turned to the outline illustrated and then severed into two parts by cutting along the line 19. Since in this embodiment the axis of the upper portion of the float will be offset laterally with respect to the axis of the lower portion, I have found it desirable to provide a weight 3b having a greater mass on the side of the float opposite the upper portion, thereby counterbalancing the laterally displaced upper portion and causing the float to ride upright in the water. As in the case of the preceding embodiments, the enlarged lower portion of each float so formed will be provided with a slantwise passageway 5b, as will be readily understood.

Modifications may be made in my invention without departing from the spirit of it and I do not intend to be limited in any manner other than as expressed in the claims which follow.

Having, however, described my invention in certain exemplary embodiments, what I desire to secure and protect by Letters Patent is:

1. A fishing float comprising an elongated body weighted at its lower end to float upright in the water, said elongated body comprising an enlarged lower portion adapted to float substantially beneath the surface of the water and an elongated upper portion of substantially reduced mass as compared to said lower portion and adapted to extend upwardly out of the water, said lower portion having a passageway therein adapted to slidably receive a fishing line, which passageway extends slantwise through the lower portion of said body with its upper end opening outwardly just above the water line of the float on one side thereof and with its lower end opening downwardly at the bottom of the float on the side thereof opposite said first named side.

2. A fishing float comprising an elongated body weighted at its lower end to float upright in the water, said elongated body comprising an enlarged lower portion adapted to float substantially beneath the surface of the water and an elongated upper portion of substantially reduced mass as compared to the lower portion and adapted to extend upwardly out of the water, said lower portion having a passageway therein adapted to slidably receive a fishing line, which passageway extends slantwise through the lower portion of said body with its upper end opening outwardly just above the water line of the float on one side thereof and with its lower end opening downwardly at the bottom of the float on the side thereof opposite said first named side, the lower end of the said passageway being spaced from the vertical center line of the lower portion of the float by a distance which is greater than the distance between the said center line and the upper end of the said passageway.

3. The structure claimed in claim 2 wherein the vertical center line of the upper portion of said float body is displaced laterally from the vertical center line of the bottom portion of the float body, and wherein the weight at the lower end of the float is distributed to offset the lateral displacement of the upper portion of the float body.

4. A fishing float comprising a relatively large lower portion and an elongated, relatively slender upper portion, said float being formed from a floatable material and weighted at its lower end so that it will float upright in the water with substantially the entire lower portion thereof submerged, the lower portion of the float having a passageway extending slantwise therethrough adapted for the passage of a fishing line, the upper end of the passageway opening upwardly at substantially the water line of the float, with the lower end thereof opening downwardly through the bottom of the float, said openings lying on opposite sides of the vertical center line of said float with the lower opening spaced from said center line by a greater distance than the upper opening.

5. A fishing float comprising an elongated body weighted at its lower end to float upright in the water, said elongated body comprising an enlarged lower portion adapted to float substantially beneath the surface of the water and an elongated upper portion of substantially reduced mass as compared to the lower portion and adapted to extend upwardly out of the water, said lower portion having a passageway therein adapted to slidably receive a fishing line, which passageway extends slantwise through the lower portion of said body with its upper end opening outwardly just above the water line of the float on one side thereof and with its lower end opening downwardly at the bottom of the float on the side thereof opposite said first named side, the bottom of said float comprising a weight through which the passageway extends, the lower end of said passageway being spaced from the vertical center line of the lower portion of the float by a distance which is greater than the distance between the said center line and the upper end of the passageway.

References Cited in the file of this patent

UNITED STATES PATENTS

| | | |
|---|---|---|
| 1,112,049 | Anthony | Sept. 29, 1914 |
| 1,243,768 | Scott | Oct. 23, 1917 |
| 2,492,033 | Cherriere | Dec. 20, 1949 |

FOREIGN PATENTS

| | | |
|---|---|---|
| 980,252 | France | Dec. 27, 1950 |